United States Patent [19]

Palmer

[11] Patent Number: 5,737,222
[45] Date of Patent: Apr. 7, 1998

[54] APPARATUS FOR MEASURING LIFT FORCES BASED UPON DIFFERENTIAL PRESSURE BETWEEN SURFACES OF AN AIRCRAFT

[75] Inventor: Steven D. Palmer, Burlington, Iowa

[73] Assignee: AERS/Midwest, Inc., Burlington, Iowa

[21] Appl. No.: 540,262

[22] Filed: Oct. 6, 1995

Related U.S. Application Data

[63] Continuation of Ser. No. 978,347, Nov. 18, 1992, Pat. No. 5,457,630.
[51] Int. Cl.$^6$ .............................. G06G 7/76; B64C 15/00
[52] U.S. Cl. ...................... 364/424.013; 364/427; 364/424.06; 364/424.016; 364/551.01; 244/12.1; 244/201; 244/203; 340/959; 340/967; 73/178 R; 73/178 T; 180/116; 180/117
[58] Field of Search .................... 364/424.03, 424.01, 364/435, 439, 427, 428, 551.01; 73/178 R, 178 T, 9, 65.06, 182, 861.65, 179; 244/12.1, 181, 182, 194, 204, 73 C, 219, 183, 23 R, 207, 208, 12.5, 45 R, 55, 198, 76 R, 195, 203, 91, 199, 12.3, 53.3; 340/959, 967, 968, 960, 945; 180/116, 117

[56] References Cited

U.S. PATENT DOCUMENTS

| 2,601,962 | 7/1952 | Douglas | 244/201 |
|---|---|---|---|
| 2,744,698 | 5/1956 | Baynes | 244/201 |
| 2,950,879 | 8/1960 | Smith | 244/198 |
| 3,142,457 | 7/1964 | Quenzler | 244/203 |
| 3,646,811 | 3/1972 | DeLeo et al. | 73/182 |
| 3,691,356 | 9/1972 | Miller | 364/427 |
| 4,110,605 | 8/1978 | Miller | 364/463 |
| 4,122,522 | 10/1978 | Smith | 364/427 |
| 4,194,707 | 3/1980 | Sharpe | 244/9 |
| 4,202,518 | 5/1980 | Burnham et al. | 244/12.1 |
| 4,490,802 | 12/1984 | Miller | 364/567 |
| 4,516,124 | 5/1985 | Shannon et al. | 340/960 |

(List continued on next page.)

OTHER PUBLICATIONS

AIAA AIAA-94-0800 Effect of Initial Ice Roughness on Airfoil Aerodynamics, M. Bragg et al., 32nd Aerospace Sciences Meeting and Exhibit, Jan. 10-13, 1994, pp. 1-19.

Maximum Lift Degradation Due to Wing Upper Surface Contamination, Walter O. Valarezo, Nov. 1993, Montreal, Canada.

Journal of Aircraft, Sep.-Oct. 1993, vol. 30, No. 5, pp. 689-694.

AIAA AIAA-93-3534 Navier-Stokes Applications to High-Lift Airfoil Analysis, W.O. Valarezo et al., AIAA 11th Applied Aerodynamics Conference, Aug. 9-11, 1993, pp. 1-12.

AIAA AIAA-93-3136 Topics in High-Lift Aerodynamics, Walter O. Valarezo, AIAA 24th Fluid Dynamics Conference, Jul. 6-9, 1993, pp. 1-15.

AIAA AIAA-92-0401 Maximum Lift Prediction for Multielement Wings, W.O. Valarezo et al., 30th Aerospace Sciences Meeting and Exhibit, Jan. 6-9, 1992, pp. 1-13.

Primary Examiner—Jacques Louis-Jacques
Attorney, Agent, or Firm—Wallenstein & Wagner, Ltd.

[57] ABSTRACT

An apparatus for measuring the lift generated by airfoils of an aircraft. This real-time analysis is accomplished by measuring a differential pressure between the upper and lower lift surfaces of the airfoils. The apparatus a) measures an actual differential pressure between the upper and lower lift surfaces for a given aircraft speed, b) transmits this actual differential pressure measurement to a computer, c) compares the actual differential pressure measurement with an optimal pressure differential for the same aircraft speed, and d) evaluates performance of the aircraft based on the result of the comparison. The apparatus comprises a fixed array of differential pressure sensor mechanisms for measuring actual pressure differentials and a computer for comparing optimal differential pressure measurements to the actual differential pressure measurements. Each sensor mechanism preferably contains a piezoelectric sensor that communicates with the upper and lower lift surfaces.

13 Claims, 4 Drawing Sheets

U.S. PATENT DOCUMENTS

| | | | |
|---|---|---|---|
| 4,586,140 | 4/1986 | Millen | 364/433 |
| 4,728,951 | 3/1988 | Johnson et al. | 340/968 |
| 4,775,118 | 10/1988 | Daniels | 244/134 D |
| 4,837,695 | 6/1989 | Baldwin | 364/427 |
| 4,843,554 | 6/1989 | Middleton et al. | 364/427 |
| 4,886,224 | 12/1989 | Joy | 244/23 R |
| 4,899,284 | 2/1990 | Lewis et al. | 364/435 |
| 4,936,142 | 6/1990 | Davidson | 73/179 |
| 4,980,833 | 12/1990 | Milligan et al. | 364/427 |
| 5,016,837 | 5/1991 | Willis | 244/12.1 |
| 5,047,942 | 9/1991 | Middleton et al. | 364/427 |
| 5,071,088 | 12/1991 | Betts | 244/12.1 |
| 5,082,207 | 1/1992 | Tulinius | 244/76 R |
| 5,083,279 | 1/1992 | Burdoin | 364/435 |
| 5,103,224 | 4/1992 | Arad | 340/959 |
| 5,186,415 | 2/1993 | Li | 244/12.1 |
| 5,191,791 | 3/1993 | Gerardi et al. | 73/178 R |
| 5,275,358 | 1/1994 | Goldhammer et al. | 244/91 |

APPARATUS FOR MEASURING LIFT FORCES BASED UPON DIFFERENTIAL PRESSURE BETWEEN SURFACES OF AN AIRCRAFT

This is a continuation of application Ser. No. 07/978,347 filed on Nov. 18, 1992 now U.S. Pat. No. 5,457,630.

TECHNICAL FIELD

The present invention relates to a system and apparatus for onboard analysis of lift actually being generated by the airfoils of an aircraft.

BACKGROUND OF THE INVENTION

Proper development of lift is absolutely crucial during aircraft takeoff to ensure the safety of the passengers and crew. Proper lift development is also essential for maximizing aircraft fuel efficiency, the single most costly factor in a commercial airline business. The presence of a foreign substance, such as ice or a contaminant fluid, can have a dramatic and detrimental affect on lift development and aircraft efficiency. Abnormalities in airfoil structure and unusual air conditions can also adversely affect lift development.

For these reasons, the aircraft and airline industries have dedicated large amounts of time and money to develop means for monitoring flight performance and detecting ice, wind shear, microbursts and other adverse air conditions. Examples of such systems and apparatus are described in U.S. Pat. Nos. 3,691,356; 4,110,605; 4,490,802; 4,728,951; 4,775,118; 4,837,695; 4,843,554; 4,980,833 and 5,047,942 the disclosures of which are incorporated by reference herein.

However, in spite of the importance lift development plays in takeoff safety and flight performance, none of the above systems and apparatus directly monitor or analyze the lift actually being produced by the lift surfaces of an aircraft. Nor do these systems and apparatus monitor a lift pattern generated across the wing span and communicate that information to the flight crew for determining whether an anomaly exists and whether corrective action is necessary.

In addition, no system or apparatus utilizes lift development data in conjunction with Advanced Flight Control Systems (AFCS) to control the aircraft or transmit lift development data to ground personnel for evaluation of flight performance and abnormalities in lift development.

The present invention is provided to solve these and other problems.

SUMMARY OF THE INVENTION

This invention generally relates to a system and apparatus for onboard analysis of lift as it is being generated by airfoils of an aircraft. This real-time analysis is accomplished by measuring a differential pressure between the upper and lower lift surfaces of the airfoils. The system comprises the steps of: a) measuring an actual differential pressure between the upper and lower lift surfaces, b) transmitting this actual differential pressure measurement to a computer, c) comparing the actual differential pressure measurement with an optimal pressure differential for the same aircraft speed to determine whether proper lift is being developed. The apparatus comprises an array of differential pressure sensors for measuring actual pressure differentials, and a computer for comparing optimal differential pressure measurements to actual differential pressure measurements.

The primary object of the invention is to provide a system and apparatus for onboard analysis of an actual lift pattern being generated by the airfoils of an aircraft. The actual lift pattern is compared to an expected lift pattern for a similar airfoil configuration and atmospheric conditions. Abnormalities in lift are communicated to the crew so that they can take a proper course of action. Information regarding abnormal lift development is important during all phases of aircraft flight, especially takeoff.

An additional object of the invention is to visually display the actual lift pattern to the crew of the aircraft. Trained crew members can then monitor lift development to determine whether a takeoff should be aborted or adjustments need to be made during flight.

A further object of the invention is to identify the possible cause of the abnormal lift development and advise the crew of appropriate countermeasures that can or should be taken.

A still further object of the invention is to store the lift pattern data onboard the aircraft for future use in determining whether a proper lift pattern is being achieved under similar flight and atmospheric conditions. This information can be used to achieve maximum flight efficiency.

A still further object of the invention is to permanently store abnormal lift pattern data in the aircraft computer and transmit that data to ground facilities.

A still further object of the invention is to detect a stall or near stall condition.

A still further object of the invention is to evaluate for-to-aft lift development and wing-towing lift development to maximum fuel efficiency.

A still further object of the invention is to communicate actual lift development information to the advanced flight control system(AFCS) of the aircraft to take ameliorating action to unsafe conditions.

Other features and advantages of the invention will be apparent from the following specification taken in conjunction with the following drawing.

DETAILED DESCRIPTION

Figure 1:
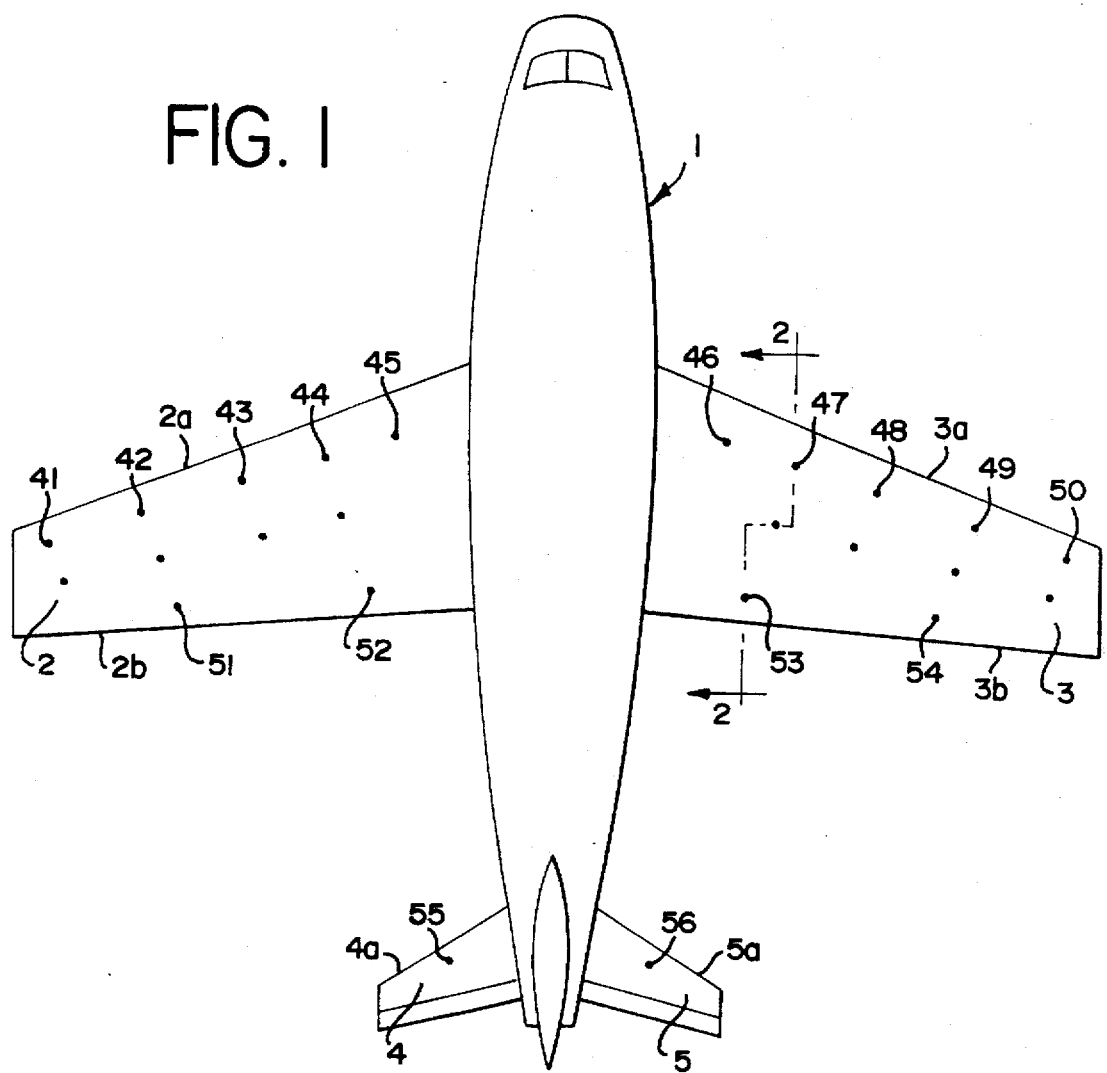
FIG. 1 is a top view showing a fixed array of pressure sensor mechanisms spaced across the wings and tail sections of an aircraft.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

Figure 2:
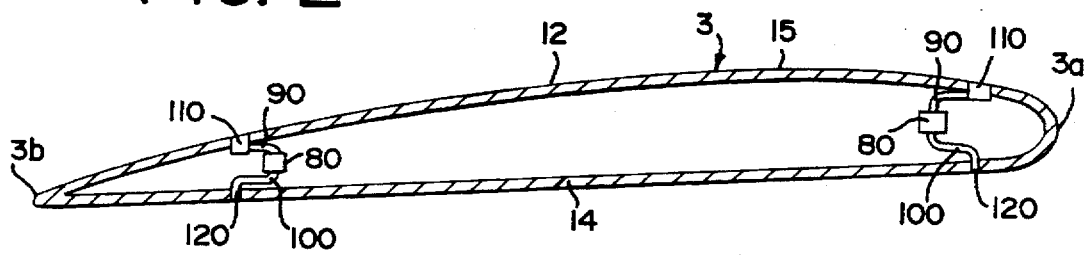
FIG. 2 is a cross-sectional view of a wing showing a leading edge and a trailing edge pressure sensor mechanism, and a chamber, an orifice, upper and lower tubes and a sensor housing for each mechanism.

FIG. 1 shows an aircraft 1 with two wings 2 and 3 and two tail sections 4 and 5. The wings and tail sections 2–5 comprise the lift surfaces or airfoils that lift the aircraft. As shown in FIG. 2, each airfoil 2–5 has an upper lift surface 12 and a lower lift surface 14.

The aircraft 1 is equipped with a fixed array of sixteen pressure sensor mechanisms 41–56 located in airfoils 2–5. Ten sensors 41–50 are located near leading edges 2a and 3a of wings 2 and 3. Four sensors 51–54 are located near the trailing edges 2b and 3b of wings 2 and 3. Two sensors 55 and 56 are located near the leading edges 4a and 5a of the tail sections 4 and 5. Although sixteen sensors are shown, it should be understood that more or fewer sensors could be used and the placement of the sensors may vary for a particular aircraft. In addition, although the sensor mechanisms 41–56 are shown and described as being in communication with both upper and lower lift surfaces 12 and 14 to measure the pressure differential between those surfaces, it should be understood that the broad aspect of the invention could utilize only the upper lift surface 12 provided the pressure of the lower lift surface 14 is determined by some other means.

As shown in FIGS. 2–5, each pressure sensor mechanism 41–56 preferably comprises a pressure sensor 60, a circuit board 70, a housing 80, upper and lower tubes 90 and 100, an upper chamber 110 and a lower orifice 120. The actual pressure being exerted on upper lift surface 12 is communicated through chamber 110 and tube 90 to one side 62 of sensor 60. The actual pressure being exerted on lower lift surface 14 is communicated through orifice 120 and tube 100 to a second side 63 of sensor 60. In this way, sensor 60 senses the actual differential pressure between upper and lower lift surfaces 12 and 14.

As shown in FIG. 2, each sensor mechanism 41–56 is mounted inside airfoils 2–5. An internal mount protects sensor 60 and circuit board 70, does not alter the desired shape of lift surfaces 12 and 14 and provides installation flexibility. Installation flexibility is important because there are typically only a minimal amount of available locations for mounting pressure sensor mechanisms 41–56 inside airfoils 2–5.

Figure 3:
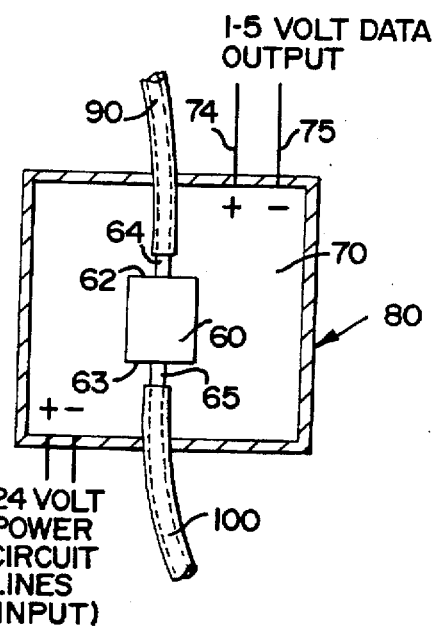
FIG. 3 is an enlarged top sectional view of a sensor housing containing a piezoelectric differential pressure sensor mounted on a circuit board.

As shown in FIG. 3, sensor 60 is preferably a standard meteorological piezoelectric sensor. Sensor 60 preferably has a voltage output in the range of about 1–5 volts for a change in differential pressure of about 5 psi. Such a sensor is sold by Foxbureau-ITC, Inc., of San Jose, Calif. as Model No. 2010. Similar sensors are also available from Aerospace Systems of Mesa, Ariz.

Sensor 60 is mounted on circuit board 70. Circuit board 70 receives and modifies the output of sensor 60. Circuit board 70 converts the sensor output, which is typically nonlinear, to a smooth linear signal. Circuit board 70 may also amplify the output of sensor 60. Sensor 60 and circuit board 70 run off a 24 volt power supply and draw an average of about 50–60 milliwatts to facilitate hook up to a typical aircraft electrical system. The voltage drop across positive output lead 74 and negative output lead 75 provides a measurement of the differential pressure between upper and lower lift surfaces 12 and 14. The negative output leads 75 of each sensor mechanism 41–56 are preferably connected to a common ground.

Housing 80 encloses and protects sensor 60 and circuit board 70. Because sensor 60 and circuit board 70 are commercially available in miniaturized form, housing 80 is approximately one and a half cubic inches. Tubes 90 and 100 fit through a pair of holes in the housing 80. A heater (not shown) may be provided to heat housing 80 and ensure sensor 60 and circuit board 70 remain at a substantially constant temperature. Maintaining a constant temperature is important because a typical commercial airplane experiences temperatures of about −40° F. to about 110° F. Such temperature changes could affect the voltage output of sensor 60 and circuit board 70. Each heater should draw about 10 watts of power to facilitate connection to the aircraft electrical system.

As shown in FIGS. 2–5, upper and lower tubes 90 and 100 communicate pressure from chamber 110 and orifice 120 to opposite sides 62 and 63 of pressure sensor 60 respectively. The sides 62 and 63 of sensor 60 are preferably provided with nipples 64 and 65 for receiving an end of tubes 90 and 100. Tubes 90 and 100 are preferably flexible and have an inside diameter of about 1/64 inch to facilitate ease of installation and minimize potential clogging.

Figure 4:
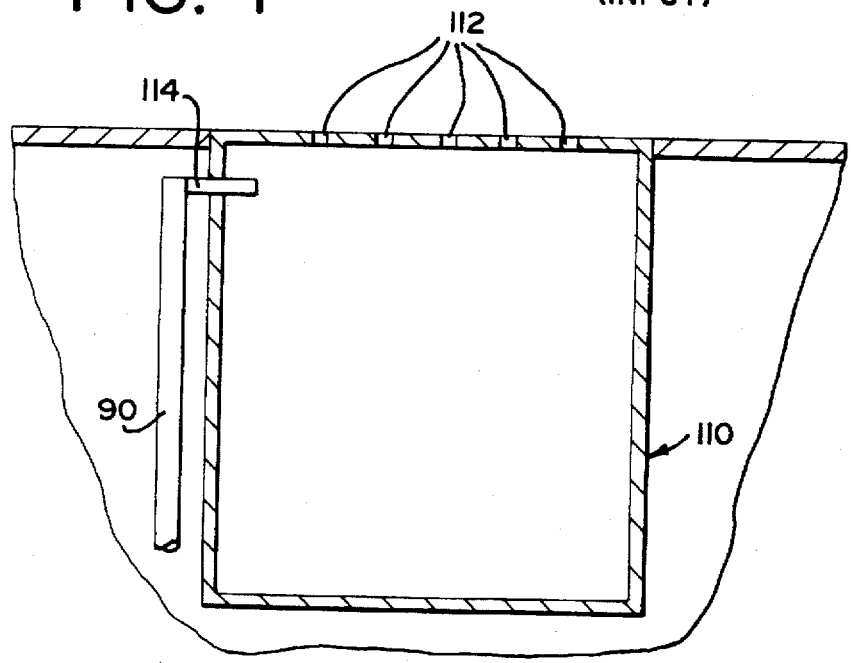
FIG. 4 is an enlarged sectional view of a chamber of the pressure sensor mechanism.

As shown in FIG. 4, chamber 110 is mounted flush with upper lift surface 12 so that it does not adversely alter the desired shape of the upper surface. A number of vent holes 112 are formed in a top of chamber 110 to expose the inside of the chamber to the external pressure acting on upper lift surface 12. These holes 112 are preferably about 1/128 inch in diameter. Chamber 110 also serves as a means for preventing the contamination of sensor 60 and clogging or tube 90. A nipple 114 for attaching an end of upper tube 90 is located at a point high enough to allow fluids or debris to accumulate at a bottom of the chamber 110 without clogging the nipple. Chamber 110 is also preferably a self cleaning heated receptacle.

Figure 5:
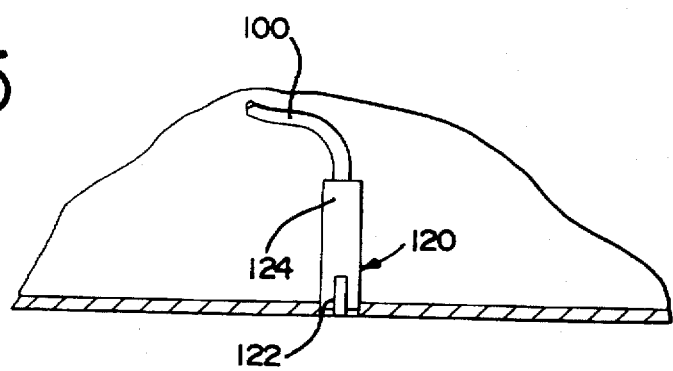
FIG. 5 is an enlarged sectional view of an orifice of the pressure sensor mechanism.

As shown in FIG. 5, orifice 120 is mounted to lower lift surface 14, preferably directly below chamber 110. One end 122 of orifice 120 is exposed to the pressure acting on lower lift surface 14. An other end 124 of orifice 120 is adapted to securely receive an end of lower tube 100.

As shown in FIG. 1, sensing mechanisms 41–50 are located near the leading edges 2a and 3a of wings 2 and 3. A greater amount of lift is generated near the leading edges so that a smaller change in lift can be detected by sensors 41–56. Only the chambers 110 need be located near leading edges 2a and 3a of wings 2 and 3. For a typical airfoil, the best results are achieved when chambers 110 are located before the first pressure spike line of wings 2 and 3. This spike line typically occurs at an apex 15 of upper lift surface 12 for a high percentage wing and more toward the leading edge of a low percentage wing.

Leading edge sensors 41–50 measure the actual differential pressure between upper and lower lift surfaces 12 and 14. These sensors 41–50 also monitor a lift pattern being generated across wings 2 and 3. Five sensor mechanisms 41-45 are located on the left wing 2 and five sensor mechanisms 46-50 are located on the right wing 3. Each set of sensing mechanisms 41-45 and 46-50 are preferably spaced equidistantly across wings 2 and 3 respectively.

Four pressure sensing mechanisms 51-54 are located near the trailing edges 2b and 3b of wings 2 and 3. These sensing mechanisms 51-54 monitor stall. Inner trailing edge sensing mechanisms 52 and 53 should be located approximately 30-35% down the wing from its base, but outside the engine nacelle. Outer trailing edge sensing mechanisms 51 and 54 should be located approximately 60-70% down the wing.

Two pressure sensing mechanisms 55 and 56 are located near the leading edges 4a and 5a of tail sections 4 and 5. One sensing mechanism is located on each tail section. The tail sensing mechanisms 55 and 56 monitor lift production of the tail sections 4 and 5 and detect icing or other contaminants effecting these lift surfaces. Tail leading edge sensors 55 and 56 can also be used in combination with wing leading edge sensors 4-50 to monitor for-to-aft lift distribution. A crew can use this for-to-aft lift information to make appropriate adjustments and maximize flight performance.

Figure 6:
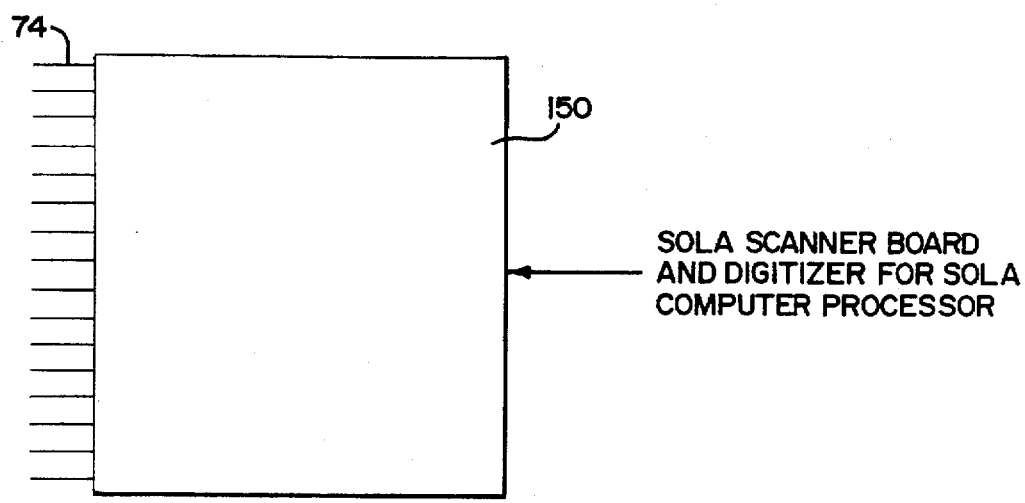
FIG. 6 is a Sensor Array Components diagram showing sixteen sensor output leads connected to a digitizer.
Figure 7:
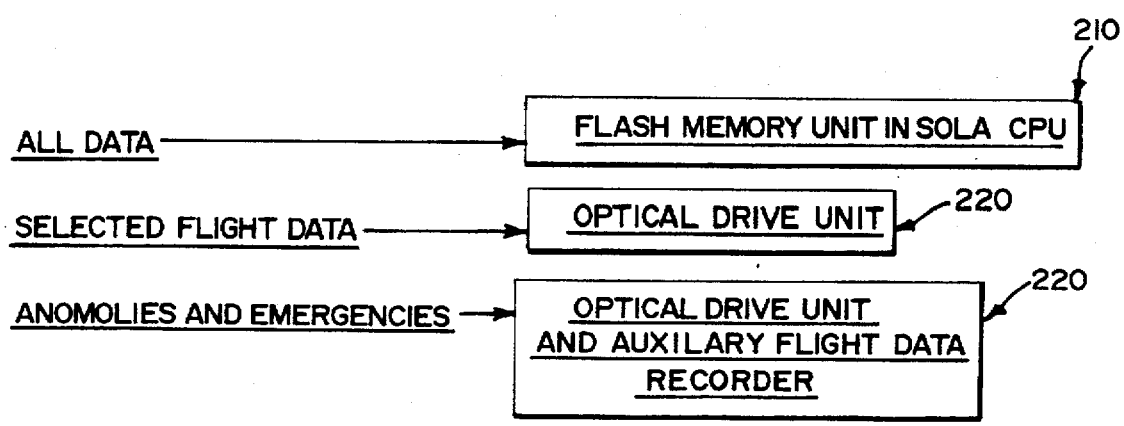
FIG. 7 is a "Data Flow to SOLA CPU Memory" diagram showing data flow from a central processing unit to onboard memory banks.

As shown in FIG. 6, the positive output lead 74 of each sensor mechanism 41-56 is connected to a digitizer board 150. Positive lead 74 transmits an analog voltage signal produced by sensor 60 and circuit board 70. Digitizer 150 converts the analog signal to a digital output for use by a central processing unit or computer 200. A separate digitizer board (not shown) may be utilized for receiving and digitizing airspeed and other aircraft and airfoil atmospheric condition data, etc. This data must correspond to the real time differential pressure measurements of voltage output leads 74. As shown in FIG. 7, central processing unit 200 communicates with several memory devices 210 and 220. Hypothetical differential pressure measurements are stored in both of these memory devices. An actual differential pressure measurement can then be compared with a hypothetical differential pressure measurement to determine whether proper lift development is being generated for a given airspeed and aircraft and atmospheric conditions.

Every type of aircraft will have its own unique lift development characteristics. In fact, it is believed that even individual aircraft of the same type do not generate exactly the same actual lift development data under the same conditions. Consequently, hypothetical data must be gathered by a test plane for each type of aircraft. The test plane is loaded with a System For Onboard Lift Analysis (SOLA) and run through a series of test flights to gather clean wing differential pressure measurements corresponding to various speeds and other aircraft flight and atmospheric conditions. Abnormal differential pressure measurements can be produced through wind tunnel tests or mathematical calculation or extrapolation. Hypothetical data is collected during all phases of normal flight, such as taxiing, take off, climb, cruise, let down, approach, landing and roll out.

The hypothetical database relates actual pressure differential measurements to corresponding given speed and other aircraft and atmospheric conditions. Other relevant aircraft condition data may include flap and slat position, angle of attack, landing gear position, etc. Atmospheric condition data may include altitude, wind speed, wind direction, etc. Some factors may be important to one or more phases of flight but not the others. Of these conditions, aircraft speed is believed to be the most critical to evaluating proper lift development.

Actual differential pressure measurements are also gathered during all phases of an actual flight. The computer 200 gathers, compares and stores 100 actual differential pressure measurements every second during critical stages of flight or when an anomaly condition is detected. During noncritical stages of flight actual data is gathered, compared and stored at a slower rate.

Only a certain narrow range of acceptable differential pressure measurements will be selected. Deviation from the acceptable range of lift production will trigger an instant analysis of the problem which will mathematically define the possible cause of the unacceptable readings. Typically this is a simple matter of division in that all contaminants tested have a unique finger print (i.e., on an 18% thickness to chord ratio wing, a clean wing reading is 100%, type II fluid contamination is 92-95%, rime ice 63-72% clear ice or mixed ice in excess of $1/32$ inch typically falls below 60%) wind related problems such as wind shear, microburst cross winds, etc. all present equally recognizable variations in sensor to sensor wing to wing only for-to-aft readings as well. Differential pressure measurements for these recognized abnormal conditions would be stored in one of the two databases or memory devices 210 or 220.

Actual differential pressure measurements are also used to compile actual optimal differential pressure measurements for later use. Actual optimal data is preferably stored in a separate database from the hypothetical optimal data. Actual optimal data is specific to the particular aircraft in which SOLA is installed, and is updated each flight. The computer 200 will use actual optimal data as a primary source of reference for comparing actual pressure differential data to determine if an abnormal differential pressure or lift pattern condition exists.

Figure 8:
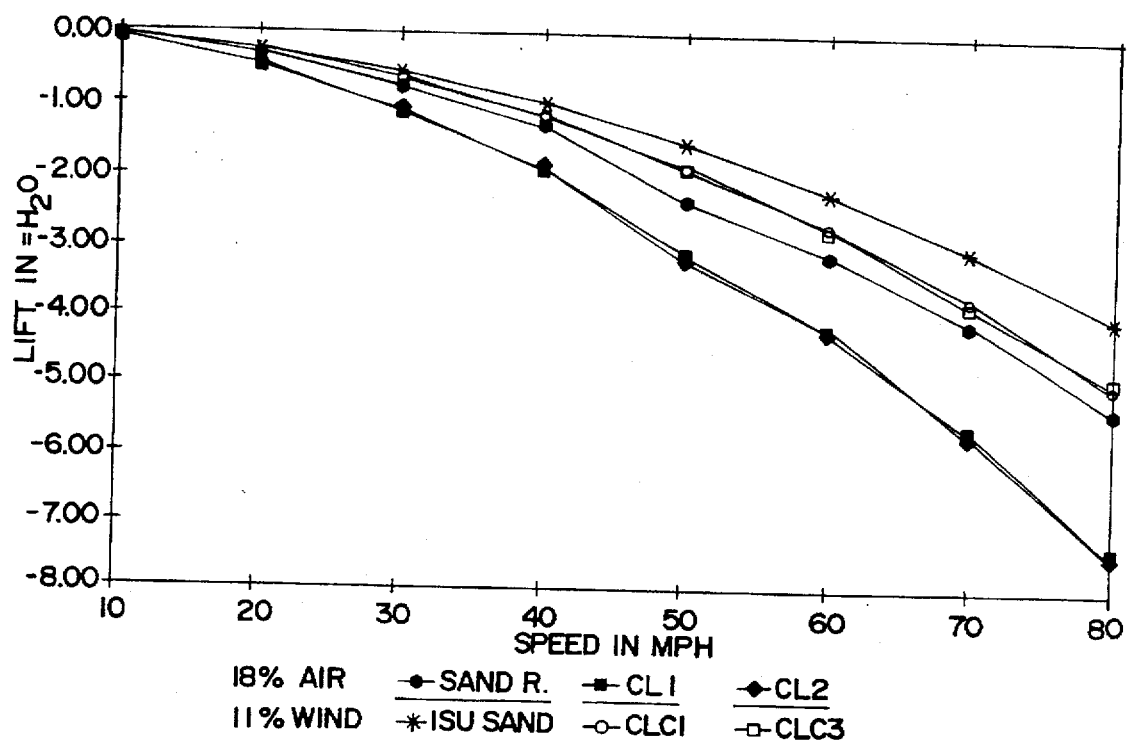
FIG. 8 shows a diagram entitled "Comp. Flight Tests with ISU W. Tunnel Wing, Wing ~18% , Plane ~11% ISU " showing a lift curve of an aircraft during takeoff when the wings are clean, when rime ice is present, when a fluid contaminant is present, and when the leading edge has been roughened by attaching sandpaper to a leading edge of the wing.

FIG. 8 is a graph showing lift development for wind tunnel tests performed on a SOLA equipped aircraft. As can be seen from the graph, SOLA is capable of distinguishing an optimal clean wing pressure differential from anomalous ice, fluid contaminant pressure differentials. As can readily be seen from FIG. 8, distinctions between proper and improper lift development can be made at speeds well under 30 miles per hour. Detection of an anomaly at a low speed is particularly important because it enables a pilot to detect an abnormality while taxiing or to safely abort a take off.

Figure 9:
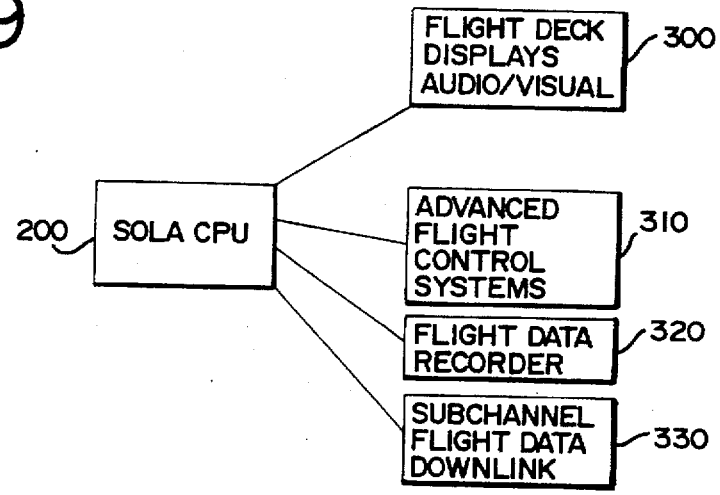
FIG. 9 is a "SOLA CPU Data Output Chart" diagram showing data routings after the data is processed by a central processing unit.
Figure 10:
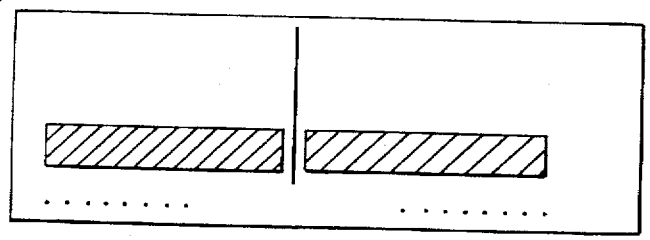
FIG. 10 shows a SOLA screen display of a normal aircraft lift pattern during sustained level flight.

FIG. 9 shows a very basic SOLA output chart. The computer can be linked with several onboard systems, so that lift development data can be passed on to these systems. A flight deck display 300 monitors lift production visually. An example of a display showing a normal lift pattern during sustained flight is shown in FIG. 10. When an anomaly is detected, the crew will be advised both audibly and visually. In certain instances the crew may be advised of the corrective action that can be taken.

An advanced flight control system (AFCS) 310 will likewise be appraised of the lift data and any anomalies present. It is believed that computer programs can be developed to direct the AFCS to react to anomalies as they are detected. This ability to interact should greatly enhance the ability of the aircraft to perform more efficiently and much more safely than previously possible. Reaction times will be measured in milliseconds rather than in seconds during critical situations.

A flight data recorder 320 can likewise be enhanced from a performance standpoint. Additional vital information including low altitude readings can be included as can a myriad of other vital statistical data.

A subchannel flight downlink 330 can also be connected to the SOLA computer. This will enable a ground crew to monitor flight performance data during flight. It will also enable lift development data to be safely stored in the event of an accident.

As shown in FIG. 7, vital flight data is stored in both temporary and permanent storage facilities. SOLA preferably has a flash memory device 210 capable of storing 100 megabytes and an optical memory device 220 write or read only memory (WORM) capacity of storing nearly one billion bytes of data. The flash memory device 210 will maintain flight data on a flight by flight basis. The monitoring of the aircraft's performance and any anomalies will be kept on both mediums 210 and 220. An optical drive 220 will act as an auxiliary flight data recorder and will keep only very select data from each flight. However, in the event of a critical anomaly the optical drive 220 and flash memory 210 will keep very detailed analysis of the event. The flash memory 210 will be very flight intensive. The data on the flash memory 210 will normally be erased after each flight cycle and begin to accumulate new data as the next flight cycle begins.

In the event of a dangerous anomaly occurrence, the WORM 220 will keep a highly detailed account of the critical data as well as passing the data on to the above systems 300-330. This permanent stored data can backup the flight data recorder 320 in the event of an emergency situation or an anomaly occurrence. The optical disk medium 220 is not subject to the same ease of data loss as a typical hard drive unit. Electromagnetic forces and shock will not have nearly the effect on the optical unit 220 as they have on a hard disk. The optical drives 220 can provide a great deal of flight data to the airlines and the manufacturers. The optical drives 220 can also be easily removed for study or archival storage, and replaced with a new one in a matter of seconds. Considering all the available performance related inputs available, this particular feature should prove itself to be a very beneficial item when it comes to both maintenance or operational reviewing.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An apparatus for evaluating forces affecting an aircraft the apparatus comprising:

means for measuring an actual differential pressure between air pressures acting on two aircraft surfaces;

means for obtaining an actual aircraft speed;

means for storing differential pressure measurements for various actual aircraft speeds;

means for comparing said actual differential pressure measurement for said actual aircraft speed with the stored differential pressure measurement for that actual aircraft speed; and means for evaluating performance of the aircraft based on the result of the means for comparing.

2. The apparatus of claim 1, wherein said comparing means is a computer, said storing means is a computer database, and said actual differential pressure measuring means comprises a pressure sensor located between an upper lift surface and a lower lift surface and tubes for communicating the upper and lower lift surface pressures to said pressure sensor.

3. The apparatus of claim 2, wherein said actual differential pressure measuring means is an array of pressure sensors spaced across the lift surfaces, said array of sensors measuring a lift pattern for each of said lift surfaces.

4. The apparatus of claim 3, wherein the lift surfaces are wing and tail sections.

5. The apparatus of claim 4, wherein said array of pressure sensors comprises wing leading edge sensors, wing trailing edge sensors and tail leading edge sensors, wherein one of said tubes for each of said wing and tail leading edge sensors communicates with the upper lift surface between said leading edge and an apex of the upper lift surface.

6. The apparatus of claim 5, further comprising means for comparing actual differential pressure measurements of said wing trailing edge sensors for said actual speed with a recognized stall differential pressure measurement for said actual speed to determine whether a potential stall condition is imminent.

7. The apparatus of claim 2, wherein said pressure sensor is a piezoelectric sensor.

8. The apparatus of claim 4, further comprising means for comparing a lift pattern of one wing with a lift pattern of a second wing to determine whether balanced lift patterns are being developed.

9. The apparatus of claim 4, further comprising means for comparing said actual differential pressure measurements of said wing pressure sensors with actual differential pressure measurements of said tail pressure sensors to determine if proper for-to-aft lift is being developed.

10. The apparatus of claim 1, further comprising means for storing actual differential pressure measurements for said various actual speeds for future comparison, said actual differential pressure measurements forming actual optimal differential pressure measurements for said various actual speeds, means for comparing a future actual differential pressure measurement for said actual speed with said actual optimal differential pressure measurement for said actual speed.

11. The apparatus of claim 10, further comprising means for informing the flight crew of anomalies between said future actual differential pressure measurement and said actual optimal differential pressure measurement.

12. The apparatus of claim 1, further comprising means for storing recognized anomaly differential pressure measurements of a recognized anomaly condition for various actual speeds, means for comparing said actual differential pressure measurements for said actual speed with said recognized anomaly differential pressure measurement for said actual speed to determine whether said recognized anomaly condition exists, and means for informing the flight crew when said recognized anomaly condition exists.

13. The apparatus of claim 1, further comprising means for displaying said actual differential pressure measurements onboard said aircraft.

* * * * *